United States Patent
Ritchie et al.

(10) Patent No.: US 9,767,137 B2
(45) Date of Patent: Sep. 19, 2017

(54) METHOD AND SYSTEM FOR DISTRIBUTED DATA VERIFICATION

(75) Inventors: Grant C. Ritchie, Toronto (CA); Sergejs Marins, Toronto (CA)

(73) Assignee: Apple Inc., Cupertino, CA (US)

( * ) Notice: Subject to any disclaimer, the term of this patent is extended or adjusted under 35 U.S.C. 154(b) by 880 days.

(21) Appl. No.: 13/643,895

(22) PCT Filed: Apr. 26, 2011

(86) PCT No.: PCT/CA2011/000470
§ 371 (c)(1),
(2), (4) Date: Jun. 11, 2013

(87) PCT Pub. No.: WO2011/134053
PCT Pub. Date: Nov. 3, 2011

(65) Prior Publication Data
US 2013/0304708 A1 Nov. 14, 2013

Related U.S. Application Data

(60) Provisional application No. 61/327,942, filed on Apr. 26, 2010.

(51) Int. Cl.
*G06F 7/00* (2006.01)
*G06F 17/30* (2006.01)
*G06Q 30/02* (2012.01)
*H04L 12/66* (2006.01)

(52) U.S. Cl.
CPC ....... *G06F 17/30371* (2013.01); *G06Q 30/02* (2013.01); *G06Q 30/0208* (2013.01); *H04L 12/66* (2013.01)

(58) Field of Classification Search
CPC ............ G06Q 30/02; G06C 30/0208
USPC ........................................ 707/748
See application file for complete search history.

(56) References Cited

U.S. PATENT DOCUMENTS

| | | |
|---|---|---|
| 6,253,213 B1 | 6/2001 | Vanderschaaf |
| 7,610,233 B1 | 10/2009 | Leong et al. |
| 8,635,099 B1 * | 1/2014 | Floyd .............. G06Q 10/10 705/14.1 |
| 2001/0047347 A1 | 11/2001 | Perell et al. |
| 2002/0049845 A1 * | 4/2002 | Sreenivasan ........ H04L 69/40 709/226 |

(Continued)

FOREIGN PATENT DOCUMENTS

WO 2006111012 A1 10/2006

OTHER PUBLICATIONS

International Search Report, International Patent Application No. PCT/CA2011/000470, mailed Aug. 4, 2011, 15 pages.

(Continued)

*Primary Examiner* — Van Oberly
(74) *Attorney, Agent, or Firm* — Fish & Richardson P.C.

(57) ABSTRACT

A method and system of verifying data stored in a database, by polling one or more computing devices. A server generates a poll object for a data item and a poll notification is transmitted to the one or more computing devices, whereupon users of the computing devices may respond to the poll notification and transmit responses. A set of response notifications is received and the server determines if the set of response notifications satisfies a quorum criterion. If the quorum criterion is satisfied, the server determines a data verification result, based on a tally criterion.

41 Claims, 8 Drawing Sheets

(56) References Cited

U.S. PATENT DOCUMENTS

| | | |
|---|---|---|
| 2002/0069282 A1 | 6/2002 | Reisman |
| 2003/0189592 A1* | 10/2003 | Boresjo ............... G06Q 10/107 |
| | | 715/751 |
| 2004/0019584 A1* | 1/2004 | Greening ............ G06F 17/3087 |
| 2004/0046021 A1* | 3/2004 | Chung ................... G06Q 50/34 |
| | | 235/386 |
| 2004/0068692 A1 | 4/2004 | Cho et al. |
| 2005/0091229 A1 | 4/2005 | Bali et al. |
| 2007/0064626 A1 | 3/2007 | Evans |
| 2008/0109491 A1* | 5/2008 | Gupta .................... G06Q 10/10 |
| 2009/0063252 A1* | 3/2009 | Abhyanker ............ G06Q 30/02 |
| | | 705/7.32 |
| 2009/0221365 A1 | 9/2009 | Levy |
| 2011/0238735 A1* | 9/2011 | Gharpure ............... G06Q 10/00 |
| | | 709/203 |
| 2012/0221505 A1* | 8/2012 | Evans .................... G06Q 10/10 |
| | | 706/52 |

OTHER PUBLICATIONS

International Preliminary Report, International Patent Application No. PCT/CA2011/000470, mailed Nov. 8, 2012, 14 pages.
Canadian Office Action for Application No. 2,797,540, dated Mar. 15, 2017, 6 pages.

\* cited by examiner

METHOD AND SYSTEM FOR DISTRIBUTED DATA VERIFICATION

CROSS-REFERENCE TO RELATED APPLICATIONS

This application is a §371 U.S. National Phase of International Application Serial no.: PCT/CA2011/000470 filed Apr. 26, 2011, which in turn claims priority from United States Provisional Patent Application No. 61/327,942, filed Apr. 26, 2010. The entirety of U.S. Provisional Patent Application No. 61/327,942 is hereby incorporated by reference.

FIELD

The embodiments described herein relate to methods and systems for verifying the currency of data in a database and in particular to methods and systems for using a network of distributed devices for data verification.

INTRODUCTION

Information on local physical establishments, including businesses and public places, is the lifeblood of the local informatics (local search) industry. This directory data includes the name, location, telephone number, website address and various other details for each establishment. Electronic data aggregators may collect and digitize this directory data and may provide the digitized directory data to intermediaries, such as Internet websites and search engines, to aid end users in navigation and finding establishments in their local area, or the products, services and other items of interest offered by these establishments.

Current electronic data aggregators collect directory data manually, using employees to copy information from various published paper directories, such as Yellowpages™. Alternatively, data aggregators may pay a fee to obtain access to electronic data stored by paper directory publishers. The directory data may be augmented by further copying information from other sources, such as government records. Paper directories are typically only published annually. However, directory data may change much more frequently throughout the year as new establishments open or as existing establishments expand services, relocate or close. As a result, the information contained in the paper directories may in some cases be out of date for nearly a year. Additionally, the process of updating electronic records from published paper directories may take up to six months from the time the paper directories are published and may further introduce new errors in the updating process. Accordingly, search results of the electronic directory data may reference information that is up to eighteen months old. In particular, search results may contain establishments that no longer exist while failing to identify establishments that have recently opened.

Additionally, the use of paper directories imposes limitations on the type of information that is published and searchable. Specifically, establishments may not provide data regarding, for example, current products, services, coupons, events and job postings for their paper directory listings because these details change frequently. Accordingly, these details are also typically missing from search results of electronic directory data.

Furthermore, current electronic data aggregators require significant infrastructure to maintain and update their directories. In some cases, thousands of employees are used to track changes in various paper directories. Given the large number of existing establishments, estimated at over fifteen million in North America alone, it is difficult to keep up with changes even with a large workforce of employees. None of the current electronic data aggregators track changes globally.

SUMMARY

In a broad aspect, there are provided methods of verifying a data item stored in a database by polling one or more computing devices, and systems for carrying out the methods. The methods may comprise: generating a poll object for the data item; determining a quorum criterion and a tally criterion for the poll object; transmitting a poll notification associated with the poll object to the one or more user computing devices; receiving a set of response notifications from one or more responding devices, the one or more responding devices comprising at least one of the one or more computing devices; determining, using a processor, whether the set of response notifications satisfies the quorum criterion; if the quorum criterion is satisfied, determining, using a processor, a verification result based on the tally criterion and the set of response notifications; and updating the data item based on the verification result.

In some embodiments, the method may further comprise identifying the one or more computing devices based on a target criteria.

In some embodiments, the target criteria is a device location of the one or more computing devices, and the identifying comprises locating devices within a predetermined range of a location associated with the data item.

In at least some embodiments, the target criteria may relate to a user profile associated with each of the one or more computing devices. The target criteria may also relate to the data item. The target criteria may also relate to the poll object.

In at least some embodiments, the method comprises, if the quorum criterion is not satisfied, increasing a priority associated with the poll object.

In at least some embodiments, the tally criterion is a majority of the one or more responding devices.

In at least some embodiments, the quorum criterion is a predetermined number of devices.

In at least some embodiments, the method further comprises: if the quorum criterion is not satisfied, changing the quorum criterion; and transmitting a further poll notification associated with the poll object to one or more additional computing devices, wherein the one or more responding devices also comprise at least one of the one or more additional computing devices.

In at least some embodiments, the method further comprises: transmitting the verification result to the one or more responding devices; receiving a challenge notification from a challenging device in the one or more responding devices.

In at least some embodiments, the target criteria is at least one factor selected from the group consisting of: a time elapsed since the data item was last verified, a time elapsed since the poll notification was transmitted, a priority associated with the data item, an activity history proximate to the data item, and a priority associated with the poll object.

In some embodiments, the one or more computing devices comprise at least one mobile device.

In at least some embodiments, a user profile may be associated with each of the one or more computing devices. The user profile may comprise a score value, and the method may further comprise updating the score value for the user profile associated with at least one of the one or more responding devices, based on the verification result.

In some embodiments, the target criteria is an anticipated score value adjustment.

In at least some embodiments, the target criteria includes at least one factor selected from the group consisting of: a user availability in a user profile, a user preference in the user profile, and a user history in the user profile.

In some embodiments, the verification result is determined based on the tally criterion by weighting the set of response notifications according to the score value associated with each of the one or more responding devices.

In some embodiments, the quorum criterion is determined to be satisfied by weighting the set of response notifications according to the score value associated with each of the one or more responding devices.

In at least some embodiments, the method further comprises: receiving a challenge bid from a challenging device, the bid being a portion of the score value associated with the challenging device; transmitting a bid notification for the bid to a plurality of computing devices; receiving a matching bid from a second computing device, the matching bid being a portion of the score value associated with the second computing device; verifying the data item in a challenge verification process to obtain a challenge result; and updating the score value for the challenging device and the second computing device based on the challenge result.

In another broad aspect, at least one embodiment described herein provides a non-transitory computer readable storage medium with an executable program stored thereon, wherein the program instructs a processor to perform a method as described herein.

DRAWINGS

For a better understanding of the various embodiments described herein, and to show more clearly how they may be carried into effect, reference will now be made, by way of example only, to the accompanying drawings which show at least one exemplary embodiment, and in which.

Figure 1:
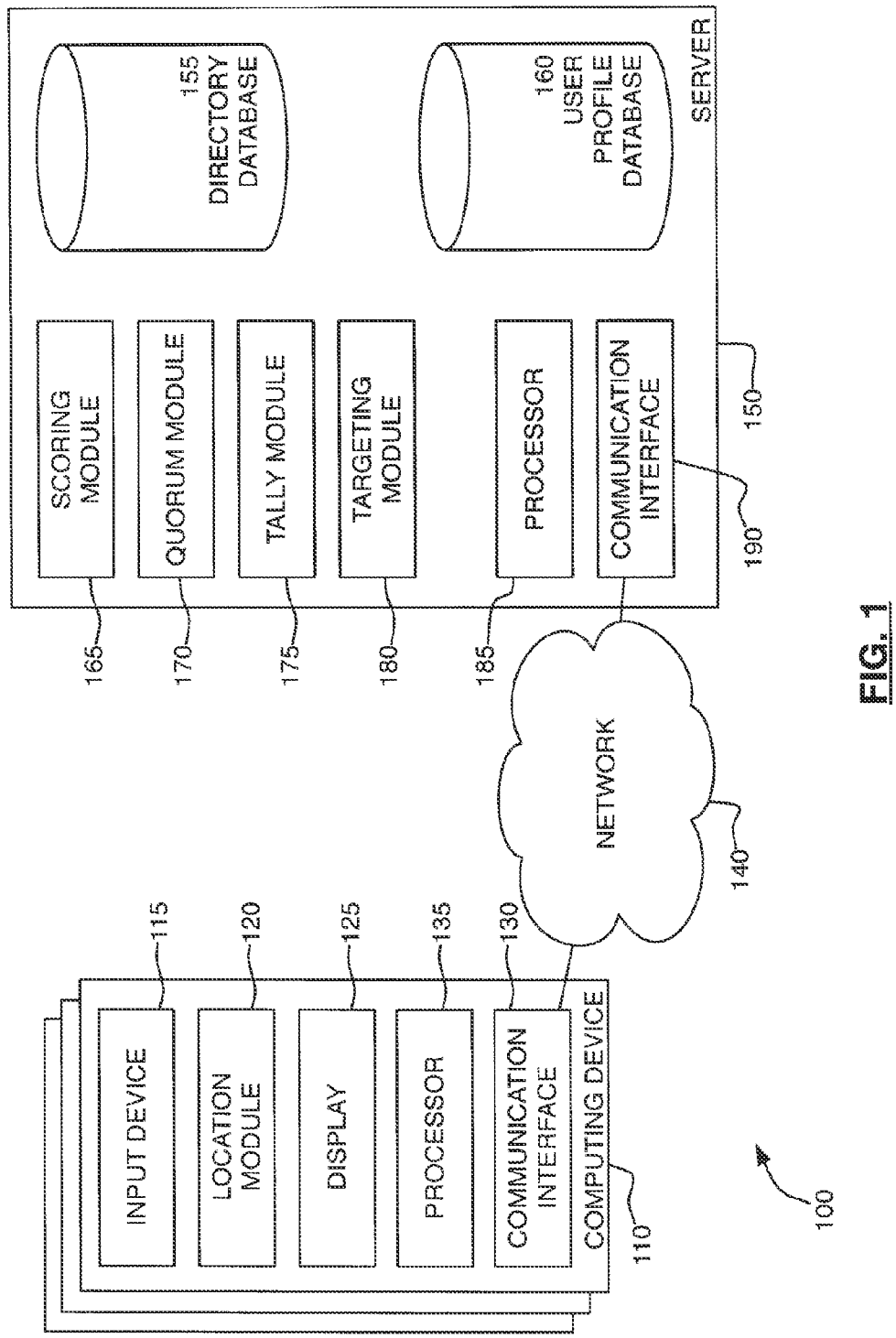
FIG. 1 is a block diagram of a data verification system.

The skilled person in the art will understand that the drawings, described below, are for illustration purposes only. The drawings are not intended to limit the scope of the applicants' teachings in any way. Further, where considered appropriate, reference numerals may be repeated among the figures to indicate corresponding or analogous elements.

DESCRIPTION OF VARIOUS EMBODIMENTS

It will be appreciated that numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way, but rather as merely describing the implementation of the various embodiments described herein.

The embodiments of the systems and methods described herein may be implemented in hardware or software, or a combination of both. However, preferably, these embodiments are implemented in computer programs executing on programmable computers each comprising at least one processor, a data storage system (including volatile and non-volatile memory and/or storage elements), and at least one communication interface. For example and without limitation, the programmable computers may be a server, network appliance, set-top box, embedded device, computer expansion module, personal computer, laptop, personal data assistant, or mobile device. Program code is applied to input data to perform the functions described herein and generate output information. The output information is applied to one or more output devices, in known fashion. In some embodiments, the communication interface may be a network communication interface. In embodiments where elements of the invention are combined, the communication interface may be a software communication interface, such as those for inter-process communication (IPC). In still other embodiments, there may be a combination of communication interfaces.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device (e.g. ROM or magnetic diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Furthermore, the system, processes and methods of the described embodiments are capable of being distributed in a computer program product comprising a physical computer readable medium that bears computer usable instructions for one or more processors. The medium may be provided in various forms, including one or more diskettes, compact disks, tapes, chips, magnetic and electronic storage media, and the like. The computer useable instructions may also be in various forms, including compiled and non-compiled code.

Electronic directories require updating to be useful. Moreover, data in an electronic directory should be verified when it is first entered, and verified and updated thereafter as needed. Updating and verification may take place at set periods, or it may be done opportunistically.

Updating and verifying the data in an electronic directory is work intensive, and if done manually, may require a large workforce of employees. This imposes a number of costs, such as training and paying employees, and acquiring and managing computer and networking infrastructure. Furthermore, verification of data may be prohibitively expensive and/or time-consuming, potentially requiring employees to call or visit the location of every establishment listed in the directory. Current systems also frequently collect data in an unstructured way that can make it difficult to search and analyze. As a result, only cursory verification may be performed in practice.

In addition to a workforce of employees trained and provisioned by a data aggregator, a network of distributed users is also capable of verifying data. The users need not be employed by, or even trained by, the data aggregator to verify data. For example, the users may simply be members of the public who are directed by the data aggregator to verify items of information in the electronic directory. In practice, since the purpose of the directory data is usually to provide information to the public, members of the public are well positioned to verify the accuracy of that directory data.

In some cases, users may not be willing to verify directory data without incentive or compensation. Further, even if compensation is offered, the risk remains that errors may be introduced or ignored due to careless or malicious behavior. Thus, in current systems, it would still be necessary to monitor verifications performed by users such as members of the public.

By providing incentives, users may be encouraged to provide accurate information when verifying data. Further, to ensure that users provide accurate information, a data verification system can require multiple users to verify the same item of data. Thus, the system may only consider an item verified once multiple users have provided independent verification and a majority of their results are in agreement. In other cases, a majority may not be required, but independent verification can be provided through the use of alternate polling mechanisms. Still further, the system may assign unequal weights to verification performed by different users, based on past performance or other factors.

Referring now to FIG. 1, there is shown an exemplary embodiment of a data verification system 100. In particular, the system is adapted to direct and facilitate the collection and verification of data regarding physical places or locations and, in particular, the system may be adapted to employ members of the public to collect and verify local data through an interactive medium such as the Internet via Internet-enabled mobile devices. The physical locations may be of the kind typically found in commercial phone book lists, such as restaurants, retail stores, health care providers, service providers, etc.

Members of the public may be assigned tasks such as answering a question, entering data, or performing an action. In particular, the tasks may be selected such that their completion results in the collection and verification of local data. Tasks may be selectively prioritized based on various factors including, without limitation, the type of task, the physical location of the user, the user's prior individual performance in completing tasks, a score or rating associated with the user, a number of accumulated rewards for each user, the nature of the inducements offered for the tasks, and the nature of the data previously gathered by the system for the places nearby the user.

Upon receiving completed tasks from users, the system can further evaluate the accuracy of the work performed by comparing with tasks performed by other users. In this way, the public can be used to collect local data and then verify the accuracy of the data collected.

In the exemplary embodiment, the system comprises a server 150 connected to one or more computing devices 110 via a communications network 140. Communications network 140 is preferably a public communications network such as the Internet. However, alternative communications networks such as the public-switched telephone network, wireless data networks (e.g., GPRS, EDGE, 3G, UMTS) and the like may be used.

In the exemplary embodiment, server 150 is a programmable computer comprising a processor 185, a directory database 155, a user profile database 160 and communication interface 190 suitable for communication over the communications network 140. In variant embodiments, server 150 may be comprised of a plurality of programmable computers in communication via a local or wide area network. Server 150 may be provided with a scoring module 165, a quorum module 170, a tally module 175 and a targeting module 180, the operation of which is described hereinbelow.

In the exemplary embodiment, directory database 155 contains data items relating to data or metadata about physical places or locations. For example, data items relating to one establishment may include: name, type (e.g., "coffee shop"), address, hours of operation, telephone numbers, website address, wireless Internet access availability, services offered, products available, prices, current promotions, photos, etc. In general, data items may be provided for any information that is publicly available about the physical place or location. In some cases, data items may relate to private information, in which case the data items may be masked or protected. The data items may have a fixed (e.g., address) or temporary (e.g., current promotions) nature, where the latter may require more frequent verification. A data item may also be provided to identify currently operating establishments, as opposed to defunct or temporarily closed establishments.

In a variant embodiment, data items may relate to private homes, condominiums, apartment buildings and the like.

In at least one embodiment, data items may be metadata relating to other data items. For example, a data item may define a geographic area or neighbourhood containing other places or locations. The data item may comprise a name and a region identifier (e.g., border) and may thus refer to other data items directly or indirectly.

In another embodiment, data items may define a class of other data items and may thus refer to other data items directly or indirectly.

Data items may be stored and correlated in directory database 155, which may be a relational database. Preferably, directory database 155 and server 150 cooperate to store each type of data item in a structured way, using unique fields and consistent formats, to facilitate searching and sorting. For example, telephone numbers may be validated for correctness and stripped of separators (e.g., dash, space) before being stored in a "telephone number" field.

In an exemplary embodiment, data items may have an explicit priority level associated therewith that may be used to ensure that higher priority data items are verified sooner than lower priority data items.

In an exemplary embodiment, data items are created by an operator or administrator of server 150. The data items may also be imported from existing data.

In at least one embodiment, data items may also be generated by users. For example, a user may generate a new data item for a new establishment (e.g., newly-opened restaurant) or geographic region (e.g., sub-neighbourhood).

User profile database 160 contains information relating to users of the system. For example, user profile database 160 may contain user names, contact information, links to other users (e.g., friends), personal information such as interests or hobbies, verification activity history, an indication of associated computing devices and a current or last associated geographic location. The user profile may also contain an indication of when the user desires or is available to receive poll notifications. For example, the user may specify times of day for receiving poll notifications, a minimum reward associated with notifications to be received, a maximum distance (e.g., no notifications for poll objects concerning data items more than five miles away), and the like.

The user profile may also contain information about the user's computing device including location, IP addresses, device identifier, and the like.

Other components of the user profile are described below. In particular, a computing device 110 associated with a particular user profile may periodically or continuously transmit a current location, which is stored in the associated user profile by server 150. Alternately, the user of the computing device may choose when to update the current location.

In some embodiments, computing device 110 may not be equipped with location module 120. Accordingly, server 150 may attempt to estimate a current geographic location of the computing device based on network location (e.g., using geolocation services), radio triangulation or the like. Alternatively, a user of the computing device may manually specify a current location.

Each user profile may have one or more score values associated with it. The score values may be updated by scoring module 165 based on the number and accuracy of verifications performed, or of data items added or edited, by the user. That is, a user may be rewarded or recognized for each successfully completed response by increasing the score value in that user's profile. Conversely, a user may be penalized for inaccurate responses by decreasing the score value.

In some embodiments, the score value may be a composite of one or more score values. When a composite score is provided, individual score values comprising the composite score may be considered as sub-scores. Further, when a composite score is provided, one or more sub-scores may be adjusted upon the completion of a response.

Examples of scores and sub-scores include a reputation value, a reward value, an asset value and a currency value. In some embodiments, sub-scores may be integrated (e.g., reward value is the same as currency value).

A reputation value may be simply a numerical or percentage value associated with the user profile. The reputation value may be increased for user profiles that have a history of accurate or correct responses to poll objects. For example, a user with a good reputation for verification may have a high reputation value, which may include an absolute value (e.g., 56 accurate verifications) or an average value (e.g., 95% accurate).

A reward value may be a numerical value associated with the user profile and reflecting an amount of collected reward points. Users may obtain reward points for accurate or correct responses to poll objects. The reward points may be redeemable for prizes or convertible into some other form (e.g., currency). In some embodiments, reward points may also be usable by the user to bid in auctions or draws provided by the system, as a form of virtual currency in online games provided by the system, and the like.

An asset value may be used to associate virtual assets with the user profile. Virtual assets may be a number of "shares" associated with high-value data items; the shares may be provided to one or more users that correctly respond to a poll object for the data items. Only a fixed number of shares for any particular data item may be available. Accordingly, when a data item changes, the associated shares may be reallocated to the user profile that provided the changed data, and deallocated from the previous "owner" user profile.

A currency value may be a type of reward value. Alternatively, the currency value may be a separate numerical value associated with the user profile and reflecting a current currency (e.g., cash) balance. The currency value may be adjusted in accordance with various credit activities (e.g., responding to poll objects) or debit activities (e.g., purchasing an item, bidding in an auction, etc.).

In some embodiments, users may purchase one or more types of score value. For example, a user may purchase an amount of reward value or currency value by providing a credit card number via an online commerce website.

Users may associate their user profile with one or more computing devices by, for example, registering the computing device with server 150, or by logging in to server 150 using their user profile from the computing devices. Correspondingly, users may log out from or unregister their computing devices.

Computing device 110 is a programmable computer comprising a processor 135, a communication interface 130 for communication via network 140, a display 125 and an input device 115 such as a keypad, pointing device or touch screen. In at least one embodiment, computing device 110 also has a location module 120 for determining the geographic location of computing device 110, for example via the Global Positioning System (GPS). In the exemplary embodiment, computing device 110 is a mobile device, such as a data communication-enabled mobile phone, smartphone or personal digital assistant (PDA). In variant embodiments, computing device 110 may be a laptop or desktop computer.

Figure 2A:
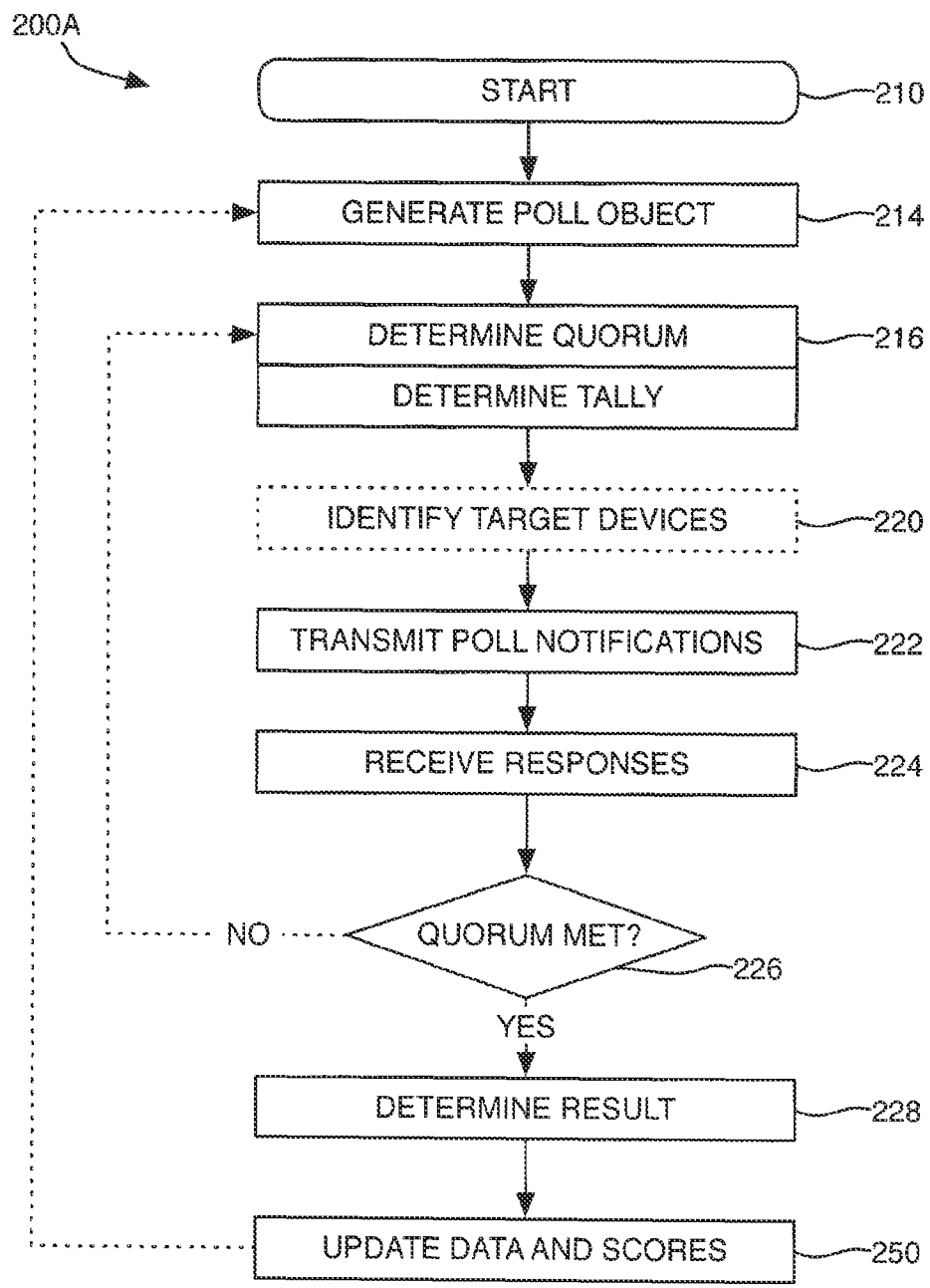
FIG. 2A is a process flow diagram showing operation of the data verification system of FIG. 1.

Referring now to FIGS. 1 and 2A, there is shown a process flow 200A followed by server 150 according to an exemplary embodiment. At 210, server 150 identifies one or more data items stored in directory database 155 that are to be verified. Data items may be identified on an as-needed basis, or at periodic intervals in a background operation. Although server 150 may identify a plurality of data items, for ease of illustration the process will described with reference only to a single data item.

In some embodiments, the background operation may be an auditing module of server 150, which can identify data items with missing or potentially inaccurate data, data items with stale data (i.e., data that has not been verified within a predetermined amount of time), or missing data items in a group of data items (e.g., a telephone number corresponding to a business establishment).

In some embodiments, an administrator of server 150 may manually identify data items that require verification, or create a higher priority for data items within a set geographic boundary, in response to an external request.

At 214, a poll object is generated for the data item. The poll object may be presented to a user of computing device 110 as a task to be completed. For example, if a data item already exists, the poll object may be a simple question with a true or false answer (e.g., "Is 212-555-1212 a valid telephone number for ABC Pets?"). Alternatively, the poll question may have multiple choice answers (e.g., "Which of the following four options is a phone number for ABC Pets?"). In still other cases, a free form question or task may be appropriate (e.g., "What is the phone number for ABC Pets?" or "Take a photo of ABC Pets"). In some embodiments, the poll object may also be a request for missing data (e.g., "Does ABC Pets have a telephone number?").

In some embodiments, the poll question may comprise a request to identify a position on a grid. Verification can thus be achieved if multiple responses are received that specify corresponding positions, or if the identified positions are within a predetermined range of each other. For example, the poll question may comprise a grid map of a geographic area. A response to the grid map question may comprise identifying a position on the grid map. To verify that the position is correctly identified, multiple responses may be evaluated to determine if they identify positions that are within a short range of each other. Outlying positions that do not correlate with those in other responses may be determined to be incorrect.

In some embodiments, the poll question may also comprise a request to identify an area on a grid. Verification can thus be achieved if multiple responses are received that specify corresponding areas, or if the identified areas overlap each other by a predetermined amount. For example, the poll question may comprise a grid map of a geographic area. A response to the grid map question may comprise identifying an area on the grid map. To verify that the area is correctly identified, multiple responses may be evaluated to determine if they identify areas that correlate or correspond with each other. Outlying identified areas that do not correlate with those in other responses may be determined to be incorrect.

In some embodiments, the poll question may also comprise a request to evaluate a photograph to identify and evaluate relevant data items. For example, the poll question (multiple choice, single choice, free form, etc.) could relate to whether the photograph contains a bank machine, or whether a local business is visible.

At 216, quorum and tally criteria for verification of data item are determined by quorum module 170 and tally module 175, respectively. In some embodiments, the quorum criterion may be determined first, while in other embodiments the tally criterion may be determined first.

The tally criterion specifies the scheme to be used to verify the data item. For example, the tally criterion for a true or false poll object may be a simple majority of responses to the poll. Specifically, the verification result or "verdict" of the poll will be determined according to the majority of responses. A tally criterion may be selected from any type of polling or voting system. For example, the tally criterion may be a single-winner voting system, such as simple majority, supermajority, weighted majority, ranked or rated polling, or the like. For poll objects in which multiple correct answers are possible, a multiple-winner voting system may also be used, such as a proportional or semi-proportional method.

In practice, the type of the poll object may determine which tally criterion is selected. For example, a simple majority may be suitable for a true or false question, whereas a ranked system may be more suitable for a question with multiple possible answers.

The quorum criterion specifies the minimum number of responses that must be received before a verification result is determined. The quorum criterion may be a predetermined number of responding user profiles or responding devices. For example, if the tally criterion is a simple majority, the quorum criterion may specify that five responses must be received before a verification result is determined. In practice, the quorum criterion need not be fixed after it is first determined, and may be adjusted for a pending poll object as necessary.

In some embodiments, responses to a poll object may be assigned different weights based on a number of factors, and as described below, in which case the quorum criterion may account for such weighting. Weighting factors may include a score associated with the user profile or some multiple thereof, a current location associated with the user profile or computing device, or the like.

For example, if the quorum criterion specifies that five responses must be received and a single response is received that has a weight equivalent to six responses, then the quorum criterion may be considered to be satisfied.

In another example, if the quorum criterion specifies that three responses are required and two responses are received, each having a weight of 1.0, then the quorum criterion may not be satisfied. In the same example, if one of the responses has a weight of 2.0 or more, the quorum criterion can be satisfied, since the combined weighted response is three.

In order to reduce the possibility of collusion, the quorum criterion may also specify that responses received from certain users may be assigned reduced or no weight. For example, if two particular users provide responses to two or more of the same poll objects, their user profiles may be correlated with each other and server 150 may disregard or discount responses from one or both users.

Other methods of correlating the users may also be used, such as personal information, information about the computing device (e.g., unique identifying number), proximity, and the like.

Optionally, at 220 one or more targets are identified for receiving the poll object based on target criteria identified by targeting module 180. Targeting module 180 may retrieve location data from user profile database 160 for use in identifying suitable computing devices to receive a notification of the poll object. For example, targeting module 180 may search user profile database 160 for all computing devices that have a current location within a desired or predetermined range of the specified geographic area (i.e., within a one mile radius of a location associated with a data item), based on the current location identified in the user profile associated with the computing device.

Targeting module 180 may also take into account other target criteria to vary the scope of the search, including other user profile information, such as user activity history (e.g., previously performed verifications of similar or related data items), local activity history (e.g., previously performed verifications of data items by any user within a specified range of the current data item), score (including reputation and reward scores), time elapsed since the data item was last verified, time elapsed since the poll object was created, time elapsed since a notification of the poll object was transmitted, time elapsed since user profile location was updated, user availability status, a priority value associated with the data item or poll object, and the like.

Elapsed time may be based on a timestamp that is set when a data item is verified. In some cases, the elapsed time before a data item is considered "stale" may depend on the nature of the data. For example, data items that change frequently, such as hours of operation, or promotional information, may have a relatively short "half-life". Conversely, data items that change infrequently, such as an address or telephone number, may have a longer elapsed time before being considered stale.

The priority value (or priority level) may be a unique value. For example, the priority value may be an integer value between one and five. In another example, the priority value may be a multiplier value applied to other target criteria.

In some cases, the priority value can be used, for example, by an administrator when adding data items, or to improve the quality of data items, in a particular location or relating to a particular establishment. A higher priority value can be associated with certain data items that are infrequently verified, or which require urgent verification.

In some embodiments, the priority value may be a composite value comprising other target criteria, in which case changes to the priority value imply changes to the underlying component values. For example, a priority value that comprises a score value may change as a result of the score value changing.

In some embodiments, users and/or computing devices may submit poll requests for a poll object to be completed (i.e., within the vicinity or at that moment). In at least one embodiment, computing devices 110 may continually or periodically transmit poll requests to server 150. For example, poll requests may be transmitted every fifteen seconds while the computing device 110 is active.

In addition to poll requests, computing devices 110 may also transmit location data continually or periodically.

Accordingly, when server 150 receives a poll request from a first computing device, a targeting criterion may be an indication of the poll request or an availability to respond to a poll object that identifies the first computing device. In at least one embodiment, receipt of a poll request may initiate poll object generation as described below with reference to FIGS. 2A to 2B.

Targeting module 180 may pre-compute an anticipated score value adjustment to be provided to each individual targeted user profile that sends a response corresponding to the verification result. The score value adjustment to be provided may differ according to the individual user profile.

For example, a user profile with a current score value of 10,000 may be offered a score adjustment of +500 for correctly responding to a poll object, whereas a user profile with a current score value of 100 may be offered a score adjustment of +10 for responding to the same poll object.

In another example, a user profile with a current score value of $100 may be offered a score adjustment of $1 for correctly responding to a poll object, whereas a user profile with a current score value of $1 may be offered a score adjustment of $0.02 for responding to the same poll object.

Accordingly, users with a history of correct verifications are incentivized to continue contributing verifications due to the increased rewards. Incentives may increase geometrically, exponentially or according to another suitable algorithm.

In some embodiments, particularly where a composite score is used, only a simplified score value may be shown to users, while underlying scores are maintained internally by server 150.

In some embodiments, the pre-computed score value adjustment may vary according to distance of the computing device 110 to the location associated with the data item. For example, a computing device that is 100 miles from the data item location may receive a lower pre-computed score value adjustment than a computing device that is 1 mile from the data item location. Accordingly, users that are physically distant, and therefore less able to verify the data item, will be disincentivized from responding to the poll object. Targeting module 180 may identify and prioritize user profiles according to the anticipated score value adjustment.

In some embodiments, the pre-computed score value may also be adjusted to reflect the priority value of the data item to be verified. For example, an administrator may mark one or more data items (e.g., data items relating to a particular business, or data items located within a particular geographic area) as having a higher verification priority. This may happen where, for example, an administrator wishes to add or improve the quality of data items in a particular location or relating to a particular establishment. Accordingly, when the pre-computed score value adjustment is computed, the priority value may be used as a factor that increases or decreases the score value. The increased score value adjustment that is available may thus incentivize users to verify the corresponding data items.

In some embodiments, the pre-computed score value may also be adjusted based on the elapsed time since the data item was last verified. Furthermore, the score value adjustment for a successful verification may be different from the score value adjustment for an unsuccessful verification. Accordingly, users may be better incentivized to update stale data items.

In some embodiments, the user may specify a minimum threshold score value adjustment in the user profile. Accordingly, targeting module 180 may exclude the user profile from a search where the anticipated score value adjustment does not exceed the minimum threshold value. For example, the user may specify a minimum threshold of +500 to receive notifications. Accordingly, targeting module 180 will only identify the user profile if the anticipated score value adjustment is greater than (or equal to) +500.

In practice, targeting module 180 may search user profile database 160 for target user profiles based on any one of the above-noted target criteria or any combination thereof. For example, targeting module 180 may select all profiles within a one mile radius of a desired location, and also all profiles within a five mile radius with a score greater than 1,000. Various other combinations and permutations of the target criteria will be apparent in view of the present description.

Targeting module 180 may also exclude users from a search, to reduce the possibility of collusion. For example, if two particular users provide responses to the same poll objects, their user profiles may be correlated with each other and server 150 may subsequently attempt not to transmit the same poll objects to both users. Other methods of correlating the users may also be used, such as personal information, information about the computing device (e.g., unique identifying number), and the like. Accordingly, only one of the associated users may be targeted for a particular poll object.

At 222, server 150 transmits notifications of available poll objects to one or more computing devices 110 via network 140. If targets have been identified at 220, only targeted computing devices are sent notifications. Accordingly, server 150 may "push" notifications to computing devices 110. In an alternative embodiment, server 150 may transmit a general notification of available poll objects by, for example, providing or updating a repository of poll objects that can be retrieved by a computing device. Accordingly, in this alternative embodiment, computing devices may "pull" notifications from server 150.

In some embodiments, the poll notification may comprise the poll object itself or a representation of the complete poll object (e.g., XML data). Alternately, the poll notification may be a data message indicating that one or more poll objects are available (e.g., "one poll available"). In the latter case, the poll notification may comprise a link to the one or more poll objects.

Server 150 may also transmit the anticipated score value adjustment for each individual targeted user profile, as computed by targeting module 180.

Users who receive poll notifications via their computing devices choose whether to respond, as described below with reference to FIGS. 4A and 4B.

At 224, server 150 receives a set of poll responses from at least one of the computing devices (i.e., responding device) that was sent a poll notification. In practice, not all users will decide to respond to all poll notifications. Server 150 may continue to wait for additional responses until the quorum criterion is satisfied. As noted above, the quorum criterion may take into account the weights assigned to responses from various user profiles (e.g., score value).

In some embodiments, server 150 may return to determine a new quorum criterion at 216 if not enough responses are received to satisfy the quorum criterion within a predetermined interval. For example, server 150 may be configured to wait forty-eight hours before computing a new quorum criterion. In other embodiments, server 150 may override the quorum criterion if a response is received from a particular "trusted" user (e.g., administrator or user with a high score value).

In some embodiments, server 150 may be configured to proactively adjust the quorum, tally or targeting criteria on an on-going basis. For example, server 150 may prioritize partially complete polls (e.g., in which some poll responses have been received, but the quorum criterion is not yet satisfied). Prioritization may be achieved, for example, by increasing a priority level associated with the data item and recomputing the tally and/or quorum criteria at 216, thereby lowering the number of required responses or changing the metric by which the verification result is determined.

At 226, server 150 determines if the quorum criterion is satisfied. If the quorum criterion is satisfied, server 150 then determines a verification result at 228. The verification result 228 is based at least on the received set of response notifications. In the exemplary embodiment, the verification result is determined according to the tally criterion determined at 216. For example, if the poll object is a true or false question and the tally criterion is a weighted simple majority, the server 150 counts the number of true and false answers respectively, applying weights if necessary. Whichever outcome has the higher number of weighted results is thus determined to be the correct verification result.

The exact method of determining the verification result will vary according to the tally criterion selected for a particular poll object.

In at least one embodiment, the verification result is determined based on the tally criterion by weighting responses according to the score value associated with each responding device.

In one embodiment, when a verification result is determined, the poll object may be marked as inactive or unavailable, to ensure that no further response notifications are received or considered. In other embodiments, the poll object may be marked unavailable as soon as the quorum criterion is satisfied.

At 250, server 150 updates the data item associated with the poll object in directory database 155, based on the determined verification result. For example, if the verification result determines that an existing data item is still valid, a verification timestamp associated with the data item may be updated to reflect that the data item was recently verified. In another example, if the verification result indicates that multiple answers are acceptable (e.g., in a multiple answer poll object), the data item may be updated to reflect the multiple answers and any ranking thereof. In yet another example, if the verification result confirms that free form data submitted in poll responses is accurate, the corresponding data item may be updated to reflect the free form data. Server 150 may also initiate generating a new poll object to verify data items (e.g., free form data) with another suitable type of poll object (e.g., true or false poll object to verify free form data).

In some alternate embodiments, no updating may be performed upon determining the verification result. For example, if a verification result for a free form data poll object indicates that the free form data is unreliable, no data item need be updated.

If the verification result determines that an existing data item is invalid, the data item may be updated to mark it as invalid. Depending on the nature of the data item, server 150 may initiate generating a new poll object to update the data item with new form data or free form data. For example, if a first true or false verification indicates that the existing phone number for ABC Pets is no longer in service, server 150 may generate a new form data poll object to obtain a new phone number.

In some embodiments, server 150 may also update score values at 250 for responding user profiles, as described below with reference to FIG. 3.

Figure 2B:
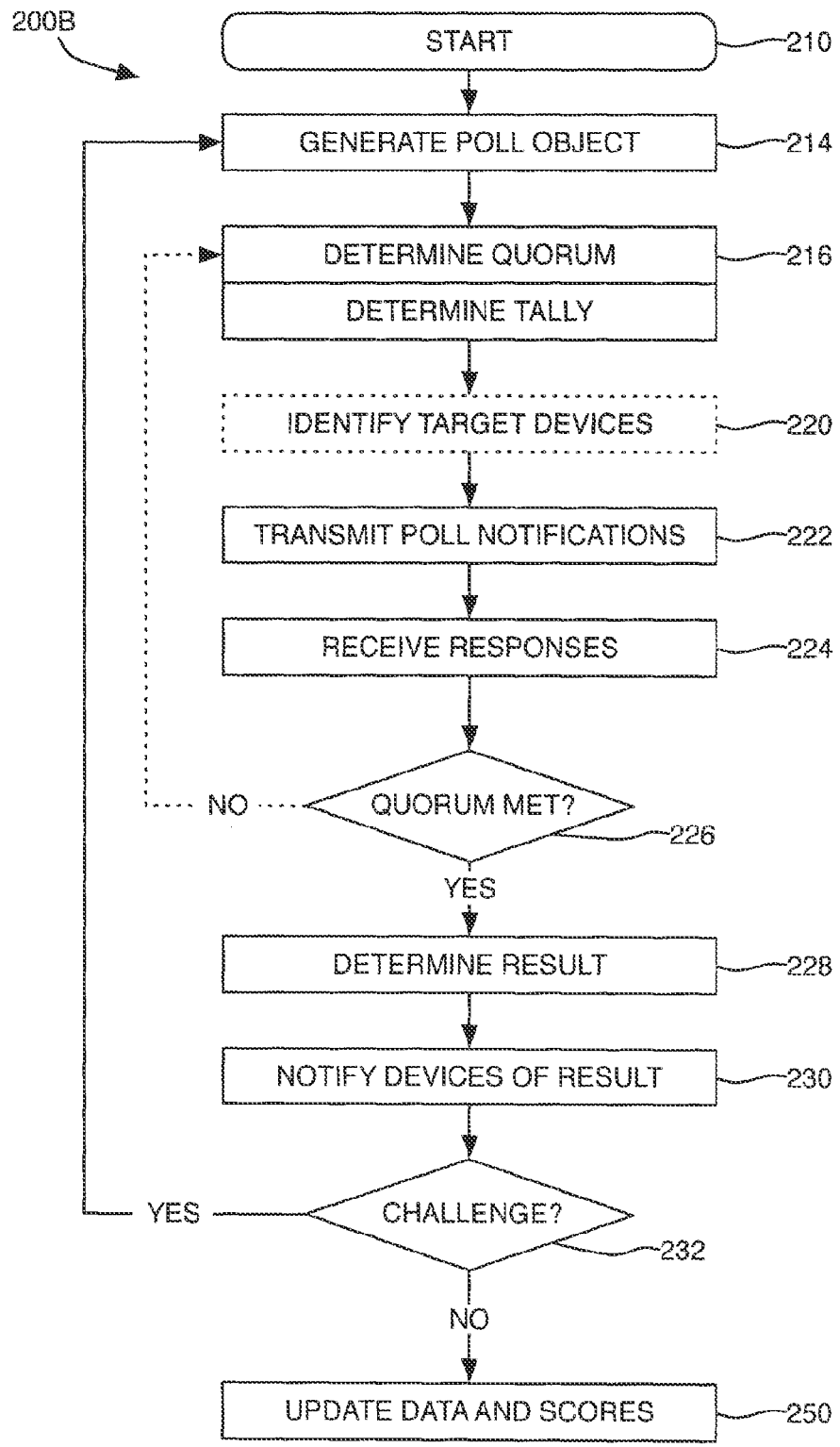
FIG. 2B is a process flow diagram showing operation of the data verification system of FIG. 1.

Referring now to FIGS. 1 and 2B, there is shown a process flow 200B according to an alternate embodiment. The process shown in FIG. 2B differs from that of FIG. 2A primarily with respect to acts 230 and 232. For greater certainty, like numbered acts are the same or analogous to those of FIG. 2A and the reader is directed to the foregoing description in respect of FIG. 2A for further details of the acts illustrated in FIG. 2B.

At 230, upon determining the verification result, server 150 transmits notifications of the verification result to the responding devices. Transmission may be performed analogously to that performed at 222.

Users of the responding devices may thus be notified whether their response was correct or accepted. If a user determines that the verification result is not in agreement with their submitted response and believes their response is still correct, the user may direct the computing device to transmit a challenge notification to server 150, as described below with reference to FIG. 4B.

At 232, server 150 receives the challenge notification and determines whether to proceed with a challenge re-verification. The challenge re-verification may comprise performing some or all of the verification process again. During the challenge re-verification, various acts may be modified. For example, different quorum, tally or targeting criteria may be selected.

Determination whether to proceed may be based on factors such as the challenging user's score value, past challenge results, and the like. If the determination is made to proceed, server 150 may return to 214 to generate a new poll object, determine a new quorum criterion and/or a new tally criterion, and otherwise carry out the verification process described in FIG. 2A a second time. In general, the new criterion may be more strict (i.e., require a higher degree of verification or less ambiguity) in view of the challenge. Server 150 may also increase the priority level associated with the data item, and increase the anticipated score value adjustment associated with responding to the poll object. Further, server 150 may direct targeting module 180 to exclude devices that responded to the poll object under challenge, to ensure that independent verification is obtained.

In some embodiments, server 150 may simply mark the poll object as active or available and return to 216 to repeat the verification process.

Following a challenge, on a second or subsequent pass, at 232 server 150 may elect not to allow further challenges and instead proceed directly to 250.

Figure 2C:
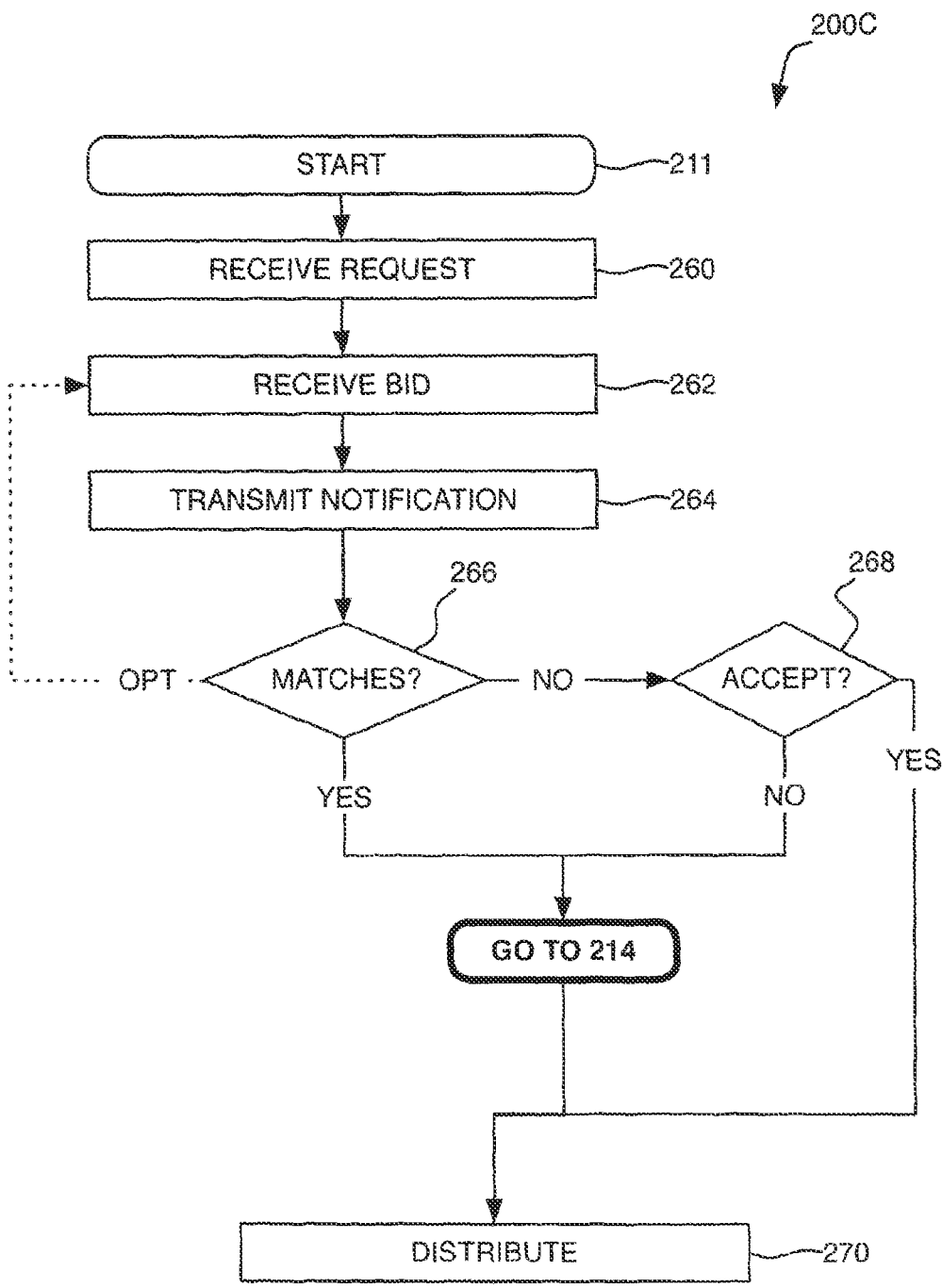
FIG. 2C is a process flow diagram showing operation of the data verification system of FIG. 1.

Referring now to FIGS. 1 to 2C, there is shown a process flow 200C in accordance with a variant embodiment. The process shown in FIG. 2C differs from that of FIGS. 2A and 2B primarily with respect to acts 260 to 270. For greater certainty, like numbered acts are the same or analogous to those of FIGS. 2A and 2B and the reader is directed to the foregoing description in respect of FIGS. 2A and 2B for further details of the acts illustrated in FIG. 2C.

In order to provide enhanced data verification and to engage more users, it may be desirable to provide a gaming element in which users may risk a portion of their score value to initiate verifications of a particular data item and thereby ensure the correctness of the data item, or to introduce missing data items. If the user is successful, they may recover the risked portion, along with portions risked by other users. In some cases, the successful user may also receive an additional amount as a reward. Conversely, if the user is unsuccessful, the user may lose the risked portion.

At 260, a challenge request identifying a particular data item (or missing data item) is received. The challenge request may be initiated by any user (a "challenger") at any time. For example, a challenger may be in close proximity to a place associated with the data item and thereby notice that the data item is inaccurate or missing. In another example, a user may wish to vouch for the accuracy of a data item, by initiating a challenge.

The data item to be challenged need not have been verified recently, or at all.

In some embodiments, the challenge request may comprise an update for the data item. In some cases, the update may be inferred from the data item. For example, if a user challenges a "true" result for a data item, it may be inferred that the data update is for a "false" result.

In order to submit the challenge request, the challenger may be required to place a "bond" or "bid" at 262. The bid (and challenge request) may also be required to vouch for, or update, an existing data item. The bid may be a portion of the challenger's score value. For example, the challenger may be required to place a cash bid, drawn from the challenger's currency value. Likewise, the challenger may be required to place a rewards bid, drawn from the challenger's rewards value. The bid amount may be reserved immediately by server 150, and held until the challenge process is completed.

At 264, server 150 transmits a bid notification. The bid notification may be transmitted analogously to a poll notification (e.g., at 222). Thereafter, server 150 may wait a predetermined period for matching bids to be received.

At 266, a matching bid may be received. A matching bid is a portion of a score value risked by a second user. The second user may risk the matching bid on the basis that the current data item is correct. In general, the matching bid will be at least equal to the challenger's bid.

In some cases, the second user may also desire to provide a larger matching bid, which is greater than the challenger's bid. If a larger matching bid is received, the challenger can be given the opportunity to meet or exceed the second user's bid. If the challenger declines, the challenge process may end and, accordingly, the challenger's bid may be reallocated to the second user. Thus, spurious challenges may be avoided by requiring a challenger to commit a portion of score value before a challenge may proceed.

Server 150 determines if a matching bid or bids have been received. If a matching bid is received, server 150 may launch a challenge verification process, which may comprise some or all of the verification process 200A or 200B. Accordingly, server 150 may generate a new poll object at 214. The challenge verification process may proceed as in 200A or 200B thereafter to generate a verification result known as the challenge result. Upon completion of the challenge verification process, server 150 may return to redistribute the bid and matching bid amounts according to the challenge result obtained, as described below with respect to 270.

Optionally, server 150 may return to 262 to accept a raised bid. The raised bid may be submitted by the original user to submit the challenge request. In some cases, any user may contribute a raised bid. If a raised bid is received, server 150 again transmits a notification at 264 and waits for matching bids at 266. This process may continue until no additional raised bids are received. Alternately, server 150 may limit the number of times a raised bid may be submitted.

If no matching bids are received, server 150 may determine whether to accept a data item submitted in the challenge request without further verification at 268. If the update is accepted, server 150 updates the data item in the database directory accordingly and immediately redistributes bid amounts, as described below with respect to 270.

If the update is not accepted without verification, then server 150 can proceed to launch a challenge verification process and generate a new poll object at 214. The challenge verification process may proceed as in 200A or 200B to generate a verification result known as the challenge result. Upon completion of the challenge verification process, server 150 may return to redistribute the bid and matching bid amounts according to the challenge result obtained, as described below with respect to 270.

When a challenge result is obtained, or if the updated data item was accepted without verification, server 150 may redistribute the submitted bid and matching bid amounts according to the challenge result at 270. In particular, if the data item is determined to have been incorrect, the challenger may recover the bid amount and the matching bid amount, resulting in a net gain for the challenger. Conversely, if the data item is determined to have been correct, the matching bidder may recover the matching bid amount and the challenger's bid amount, resulting in a net gain for the matching bidder and a net loss for the challenger. In some cases, the successful party may be rewarded with an additional amount and/or the unsuccessful party may be penalized by an additional amount.

In some cases, a challenge for which no matching bids are received may still result in a reward for the challenger.

Thus, spurious challenges can be disincentivized, since the challenger will lose a portion of their score value if wrong. Likewise, spurious matching bids are also disincentivized.

The challenge process may be "zero sum" in terms of total score amount change. However, in some cases, the amount recovered by the successful bidder may differ from the exact bid and matching bid amounts. For example, to avoid users trading equal score values via the challenge process, server 150 may deduct a fixed or proportional amount from each of the bid or matching bid amounts. In some cases, server 150 may scale the reward and penalty amounts based on various factors, for example, the type of data item, a user's reputation or total score value, amount of time since last verification, the data item's priority or proximity to a geographical region of interest, etc.

In one embodiment, if an unsuccessful party to a challenge has shares or asset value in the data item, the successful party may be allocated those shares or asset value relating to the data item as part of the redistribution process.

Figure 3:
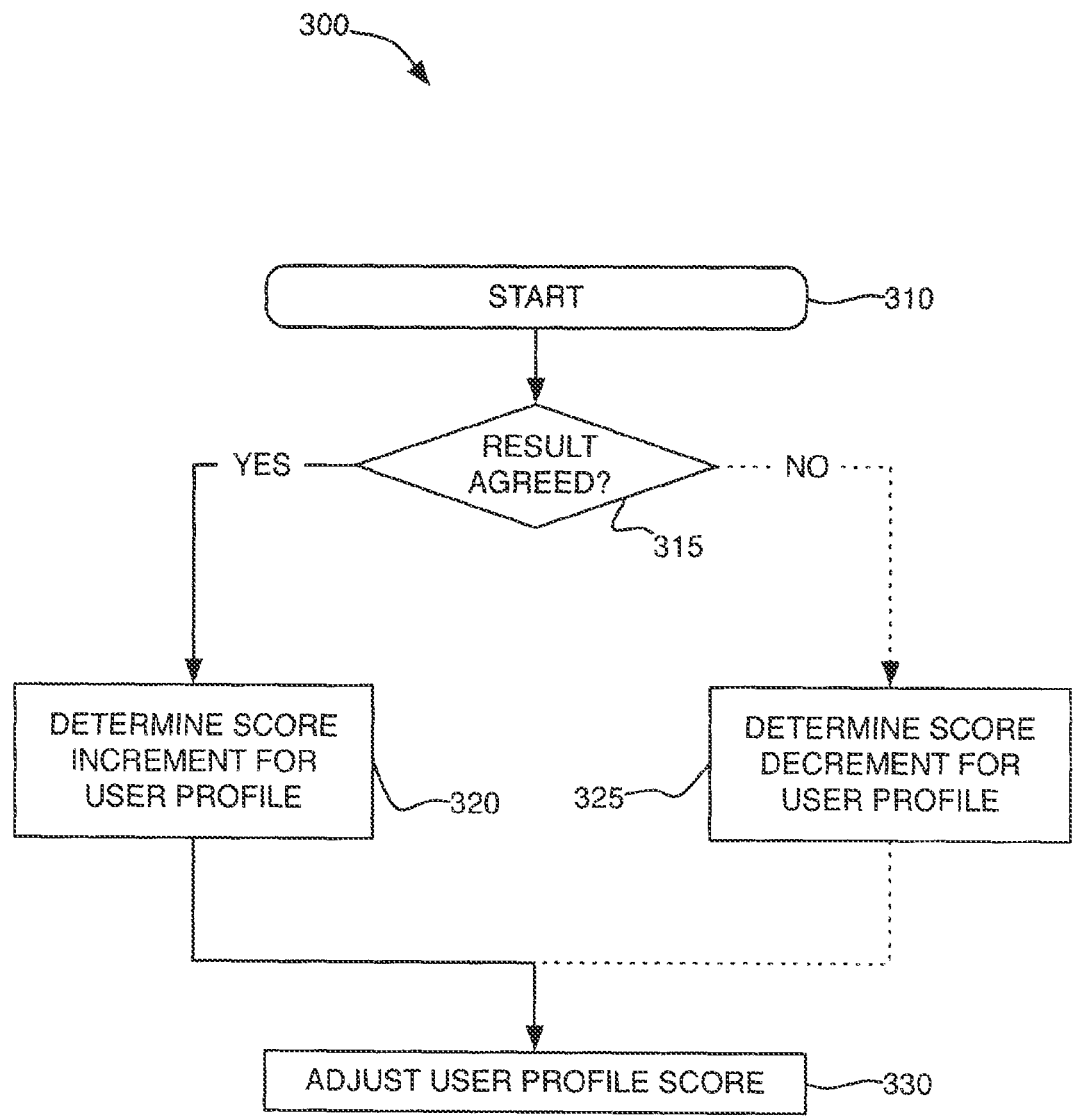
FIG. 3 is a process flow diagram showing operation of the data verification system of FIG. 1.

Referring now to FIGS. 1 and 3, there is shown an exemplary scoring process flow 300. Scoring process flow 300 may be a subprocess performed, for example, at 250 of process flows 200A and 200B. At 310, the poll response for each responding device is identified and the user profile associated with each responding device is retrieved to obtain a current score value. At 315, server 150 determines whether the poll response for a responding device corresponds to the verification result. If the particular response corresponds, a positive score value adjustment is computed at 320. Optionally, if the particular response does not correspond, a negative score value adjustment, if any, is computed at 325. Preferably, server 150 computes a score value adjustment that corresponds to the score value adjustment pre-computed by targeting module 180 at 220. In at least one embodiment, server 150 retrieves the anticipated score value adjustment pre-computed by targeting module 180 instead of computing anew. However, a different score value adjustment can be computed if desired. At 330, server 150 updates user profile database 160 to reflect the newly adjusted score value.

The score value adjustment may comprise sub-score adjustments, including reputation value, reward value and the like. Accordingly, the score value adjustment may represent a debit or withdrawal of "points" convertible into currency, or currency directly.

Variations in the order of the described processes may be made. For example, in some cases the tally criterion may be determined before the quorum criterion. In other cases, target devices may be identified before the tally criterion or quorum criterion is determined.

Figure 4A:
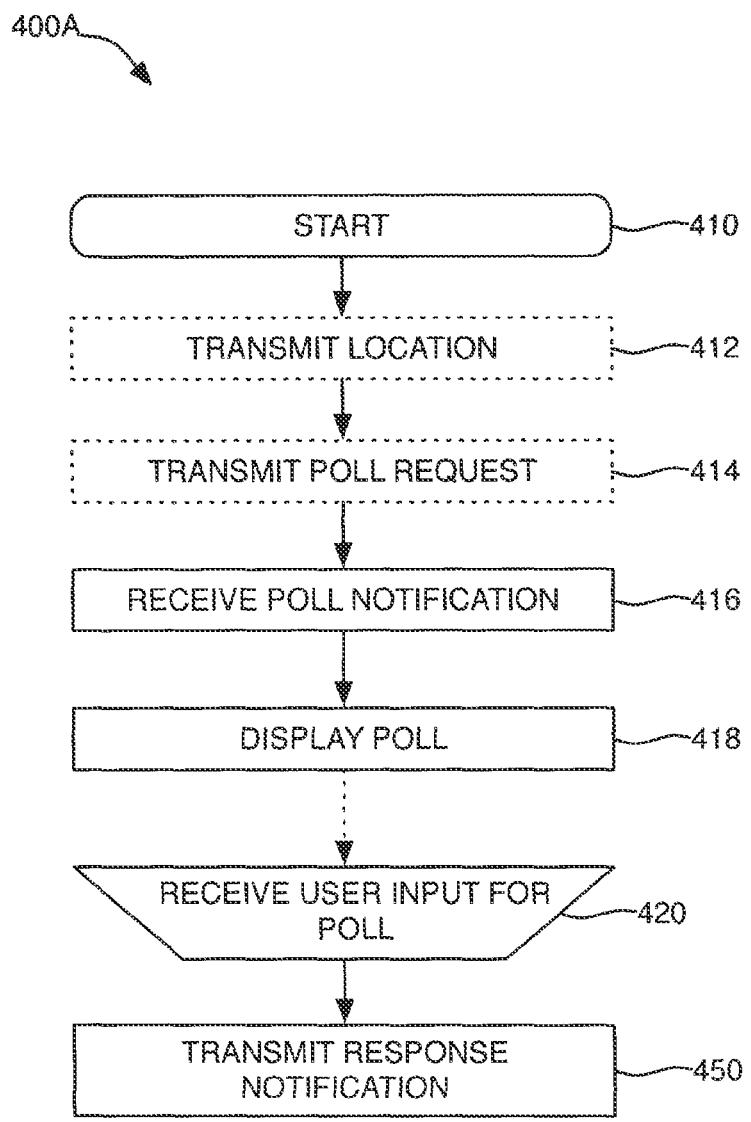
FIG. 4A is a process flow diagram showing operation of the data verification system of FIG. 1.

Referring now to FIGS. 1 and 4A, there is shown a computing device process flow in accordance with an exemplary embodiment. At 410, computing device 110 may be activated by a user and the user may direct the device to associate itself with a user profile in user profile database 160 by, for example, logging in to the server 150 via communications network 140. In some embodiments, computing device 110 may be pre-configured to automatically associate with a user profile.

Optionally, at 412, computing device 110 may determine its location using location module 120 and transmit a location notification to server 150. Location notifications may be transmitted periodically, continuously, in response to requests from server 150 or at the direction of the user (via input device 115). In some embodiments, location notifications may be transmitted as part of the poll request at 414. In other embodiments, location notifications may be transmitted in lieu of the poll request or as a proxy for the poll request.

At 414, computing device 110 transmits a poll request. Computing device 110 may transmit poll requests periodically or continuously. For example, poll requests may be transmitted while an application program is operating. In some cases, a user may desire to complete a poll and may manually direct the computing device 110 to request a poll object using the input device 115, display 125, etc. Accordingly, when a user direction to request a poll object is received, computing device 110 will also transmit a poll request.

At 416, computing device 110 receives a poll notification from server 150. The poll notification may be in response to the poll request transmitted at 414, or it may be unsolicited. In the latter case, the poll notification may be received as a result of user profile settings configured by the user and transmitted to server 150. For example, the user profile settings may indicate that the user is available or not available to respond to poll objects.

In one embodiment, the user profile settings may also be used to provide an indication of a minimum threshold for an anticipated score value adjustment. For example, the user may filter or otherwise prevent the reception of poll objects for which the anticipated score value adjustment is not above a minimum threshold.

Upon receiving the poll notification, computing device 110 displays the poll notification to the user at 418, using display 125. Computing device 110 may present a user interface to allow the user to elect whether to respond to the poll notification. For example, a dialog may be presented that allows the user to select to respond immediately, to respond later, to remind the user to respond later, or to ignore the notification. Application software on the computing device 110 may be configured to store the notification in local memory, to set reminders, or the like, as will be appreciated.

When a user decides to respond to the poll notification, computing device 110 configures a user interface to display the poll question, along with appropriate answers. For example, for a true or false question, computing device 110 may display the question and two buttons corresponding to the possible answers. The user selects only one button to respond to the question. In another example, for a question with multiple possible answers, computing device 110 may display the question and the multiple possible answers. Depending on the tally criteria associated with the poll object, the user interface may allow the user to select more than one answer, or to rank answers.

For poll objects in which free form data is requested, computing device 110 may display form data entry fields and enable free form input in the data entry fields using input device 115. Optionally, computing device 110 may validate data entered in the form data entry fields before transmitting the response.

For poll objects in which a photo is requested, computing device 110 may be equipped with a camera (not shown) for taking photographs. Photographs may be stored in an internal memory. In some embodiments, or if computing device 110 is not equipped with a camera, computing device 110 may provide a user interface for retrieving and submitting photographs from a storage device (not shown) or internal memory of the device.

For poll objects in which a map is presented, computing device displays the map on display 125. The device may receive input for identifying a position on the map via input device 115. For example, the position may be identified by cursor placement using a pointing device, by a touch on a touchscreen device, by grid coordinates, or the like. Likewise, the device may receive input for identifying an area on the map via input device 115. For example, the area may be identified by tracing an outline using a pointing device, by a touch on a touchscreen device, by grid coordinates, or the like.

At 420, computing device 110 receives the user input responding to the poll object via, for example, input device 115. Accordingly, at 450, computing device 110 formats the user input in a suitable format and transmits a response notification to server 150. Preferably, the response notification indicates the poll object to which the response notification is directed and encapsulates the response data in a structured format. For example, the response notification may comprise an XML document with appropriate predefined tags for identifying data of various types.

Figure 4B:
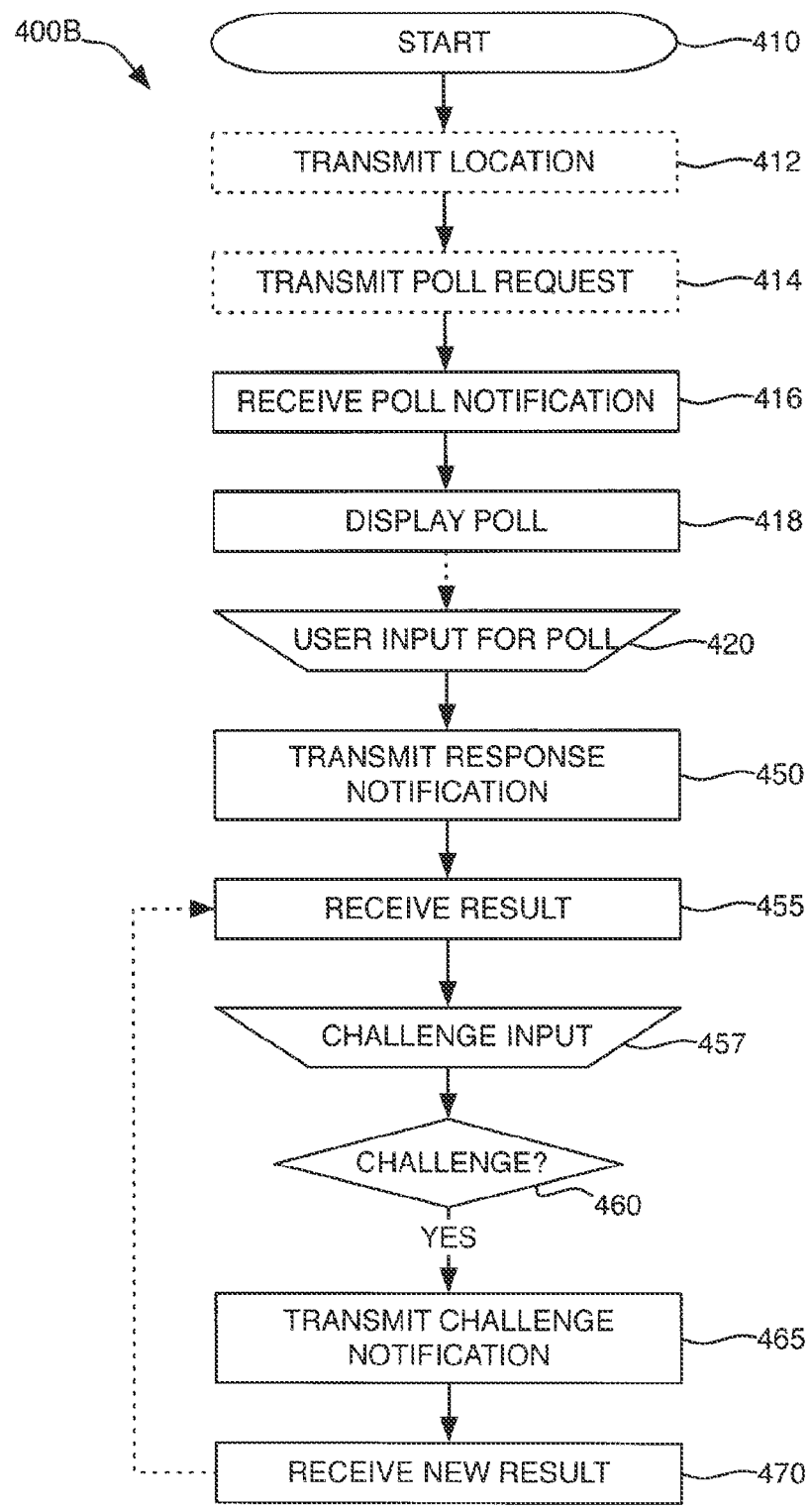
FIG. 4B is a process flow diagram showing operation of the data verification system of FIG. 1.

Referring now to FIGS. 1 and 4B, there is shown an alternate exemplary computing device process flow 400B corresponding to the server process flow shown in FIG. 2B. Process flow 400B differs from process flow 400A primarily with respect to acts 455, 457, 460, 465 and 470. For greater certainty, like numbered acts are the same or analogous to those of FIG. 4A and the reader is directed to the foregoing description in respect of FIG. 4A for further details of the acts illustrated in FIG. 4B.

At 455, computing device 110 receives a notification of the verification result for a poll object to which the computing device 110 (or user profile associated with the computing device) previously responded. The verification result may be presented to the user via display 125. If the verification result differs from the previous response, the user interface may present an option to the user to challenge the verification result. In some embodiments, the notification may provide additional details regarding the verification result (e.g., total number of responses, percentage of correct/incorrect responses, etc.), which may also be displayed.

At 457, input is received via input device 115 indicating whether the user wishes to challenge the verification result. The input may also indicate a deferral of the challenge decision, in which case the computing device 110 may set an alert to remind the user at a later time.

At 460, computing device 110 determines whether to send a challenge notification to server 150, based on input received at 457. If the computing device determines that a challenge notification should be sent, the challenge notification is transmitted at 465. The challenge notification may be formatted analogously to the response notification.

At 470, computing device 110 receives a new verification result from server 150 corresponding to the challenge. If the new verification result indicates that further challenges are possible, computing device may return to 455. Otherwise, computing device may simply display a notification of the result without providing further options. In another embodiment, notification of the challenge result may not be provided via display 125.

Server 150 may also provide for certain users to act as administrators for one or both of the directory database 155 and user profile database 160. Administrators may also have a user profile in user profile database 160, in which case the user profile will identify that the administrator user is authorized to update and maintain data in directory database 155 or user profile database 160.

Administrator users may manually update data items as needed. For example, data items may be updated manually if the owner of an establishment requests that certain data items be updated immediately or removed from directory database 155.

Data items may also be updated on an as-needed basis if it becomes apparent that the data items require immediate updating or if information is available that makes it unnecessary to perform the verification process.

Likewise, administrator users may manually update user profile database 160 as needed. This may occur where, for example, a user violates the terms of use. In such cases, the user profile may be suspended or deleted, or some punitive action may be performed (e.g., reduce score value).

In some embodiments, server 150 may provide for the exclusion of certain reserved data items from the verification process for a predetermined period. This may occur where an interested party assumes responsibility for updating the data directly.

For example, the owner or employee of an establishment may desire to directly update and maintain data items relating to the establishment. In such cases, the relevant data items may be marked as reserved or protected. Owners or employees may also have a user profile, in which case the user profile will identify that the owner or employee is authorized to update the reserved data items.

Optionally, as a safeguard, server 150 may require payment before marking data items as reserved. Server 150 may further require authorization from an administrator of server 150, who may require verification of owner or employee identity. Accordingly, only individuals verified as authorized to act on behalf of the establishment will be permitted to reserve data items.

When a reservation period ends, previously reserved data items may be marked as unreserved if further reservations are not made, thereby ensuring that reserved data items do not become stale.

Figure 5:
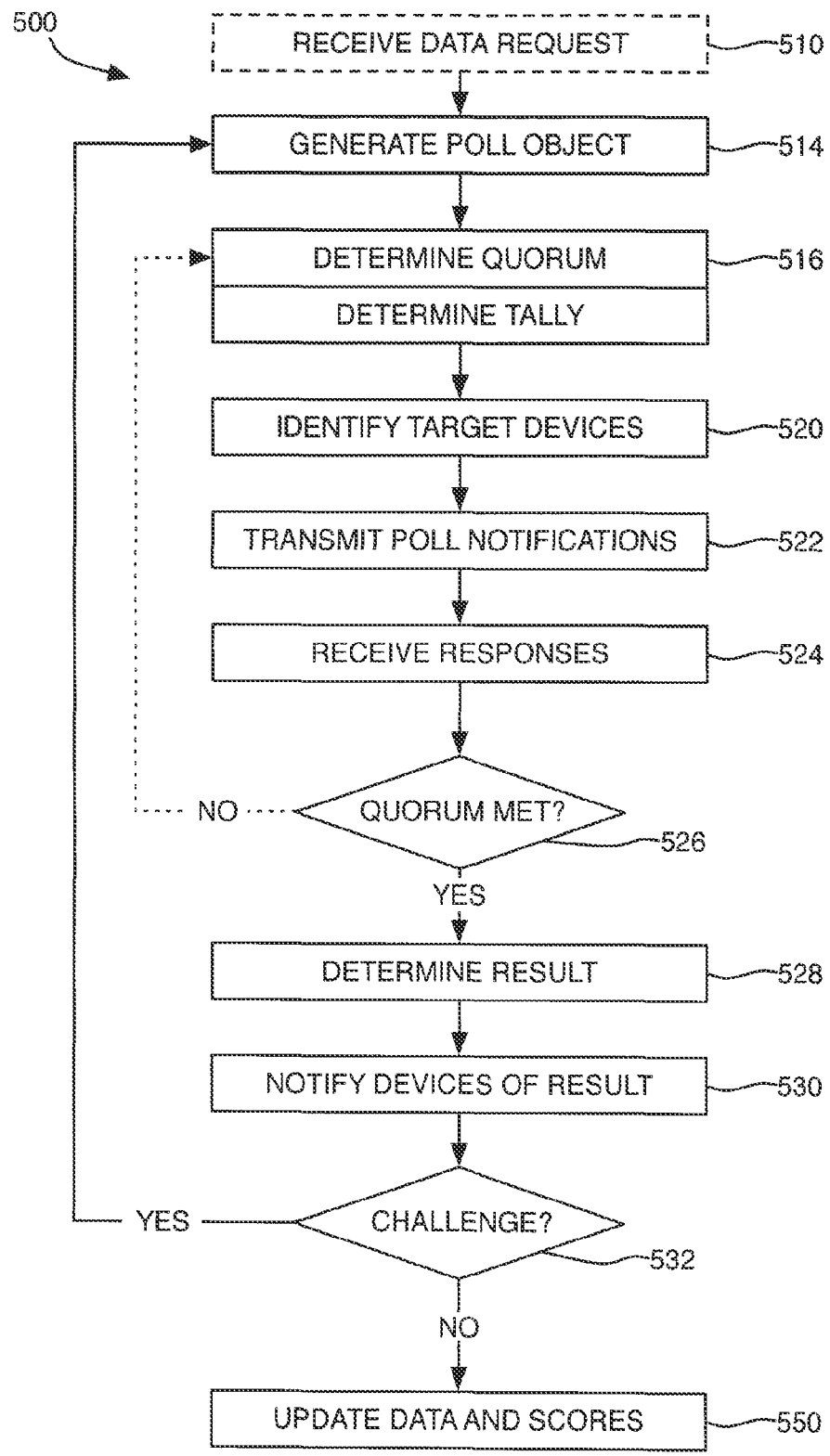
FIG. 5 is a process flow diagram of an exemplary data verification.

Referring now to FIG. 5, there is shown a process flow 500 for an exemplary data verification. In the example of FIG. 5, the data verification to be performed is a determination of whether a specific business establishment—ABC Store, for example—is "open" or "closed".

Process 500 may begin at 510, when a request is received (e.g., by server 150) for information relating to ABC Store. Server 150 may determine that the requested information (e.g., data items relating to ABC Store) is missing or out of date. Accordingly, server 150 may prioritize data items associated with ABC Store. Server 150 may also prioritize data items in a specific geographic area, for example the area in which ABC Store is located.

One or more poll objects corresponding to the prioritized data items may be created at 514. In particular, a poll object may be created to determine whether ABC Store is "open" or "closed". Accordingly, quorum and tally criteria may also be selected at 516.

Server 150 may next identify target devices (e.g., mobile devices) of one or more users that are in the vicinity of ABC Store at 520. The mobile devices may be periodically transmitting their location to server 150. Accordingly, server 150 can transmit a poll notification at 522 corresponding to the poll object to the mobile devices. However, in some cases, the user may specify a setting via a user interface on the mobile device indicating that the user does not wish to receive unsolicited poll notifications, in which case server 150 will not automatically notify the mobile device of the poll object.

Alternatively, one or more users may be able to receive on their mobile devices a list of poll objects associated with establishments in the users' vicinity. For example, even if the user does not wish to receive unsolicited poll notifications, a user of the mobile device may choose to receive a list of available poll objects via the mobile device, and select a poll object the user wishes to view (e.g., an ABC Store poll object).

The user may select a response to the poll object via a user interface of the mobile device, for example indicating whether ABC Store is currently open or closed. Accordingly, the user's selected response may be transmitted by the mobile device to the server and received by the server at 524. The user may also be able to attach a photograph taken via the mobile device as part of the submission. In some cases, server 150 may deduct or reserve (hold) a portion of that user's score value (e.g., virtual currency or virtual assets) pending a final determination of the poll object.

In the current example, the quorum criteria for the ABC Store poll object may be set to three users and the tally criteria may be set to a majority of the responses.

Alternatively, the quorum and tally criteria may be set to determine the response with the largest sum of reserved score value from all responding users, or the response provided by the users with the greatest score value (e.g., trust score).

At 526, server 150 determines whether the quorum criteria has been met. If the quorum criteria has been met, server 150 determines a result at 528 and notifies the mobile devices of responding users of the result at 530.

In some cases, if the quorum or tally criteria have not been met, they may be modified after the poll object is created. For example, to increase the rate at which polls may be completed, the quorum criteria might be set to one user, and the tally criteria might be set to that user's response.

To reduce the risk of inaccurate responses, particularly where the quorum or tally criteria allow for a small number of responses, other users may have the opportunity to review a poll object outcome and to challenge it. When a user challenges an outcome at 532, server 150 may deduct or hold a similar portion of the challenger's virtual currency or virtual assets pending the challenge outcome, as described herein.

System administrators or other trusted users may also be involved in resolving challenges. To reduce the number of challenges requiring such review, a user who responded to a poll object might be required to post additional virtual currency or virtual assets, to be reserved or held pending the outcome of the dispute. Once the challenge is resolved, the winner of the challenge (i.e., the party supporting the correct response) may receive back any reserved amounts plus a share of the other user's virtual currency or assets at 550. Accordingly, server 150 may infer that unwillingness to post further currency, assets, or score in response to a challenge, or as part of a further challenge, indicates that a user accepts that their poll response is or was incorrect.

In yet another example, it may be desirable to verify a business establishment's hours of operation. For example, a data item relating to ABC Store's hours of operation may have a "last updated" timestamp. Accordingly, server 150 may determine that the data item should be re-verified, for example if a predetermined amount of time has passed since the time indicated by the "last updated" timestamp.

A data item that is to be re-verified in this way can be prioritized by server 150. The priority assigned to the data item may be determined by taking into consideration the age of the data item (i.e., time since the "last updated" timestamp) and the reward in score value (e.g., virtual currency or assets) given for accurately verifying the data.

In some cases, data items may be manually prioritized by a system administrator, for example at the request of a business establishment. To increase the priority in such cases, the system administrator can add a multiplier that increases the existing priority of specified fields and/or the amount of rewards that can be earned upon successful re-verification, or the system administrator can directly increase these values.

Users may be allowed to configure their mobile devices to specify a minimum reward threshold, below which the users do not wish to receive automatic poll notifications. However, even if the reward associated with a poll object is below this threshold, the user may still be able to view the poll object in a list of poll objects in the user's vicinity. The list may sort available poll objects according to their respective priorities or reward amounts.

One example of a specific poll object relating to hours of operation may be, "Are the listed hours of operation (10:00 to 18:00) accurate?" Accordingly, users responding to the poll may be able to respond with "yes" or "no". If the response is "no", the user may be able to provide corrected values.

Additional examples of poll objects relating to hours of operation include: "Is Tuesday's closing time 5 pm?" or "What is Tuesday's closing time?". The latter poll object might be automatically generated in response to answers given in prior polls.

Depending on the nature of the business establishment, the quorum criteria can be selected based on a desired level of accuracy. If high accuracy is desired (e.g. because the establishment is a gas station, relatively distant to a highway, and therefore risky for drivers to visit after hours if they are low on fuel), then the quorum criteria can be set high as well. For example, three or more users, or users with sufficiently high trust scores, may be required.

In some cases, a party with an interest in the business establishment (e.g., owner, neighborhood association, etc.) may be able to directly request high accuracy or even the specific quorum criteria.

Similarly, the tally criteria can be set based on the quorum criteria, the data to be verified and/or the level of accuracy required. Accordingly, the verdict may be based on a majority, a super-majority, or even unanimous responses.

If the tally criteria is not set to require unanimity then, to provide an additional assurance of accuracy, users responding to the poll object may be permitted to challenge the verdict, as described herein. To discourage improper challenges, server 150 may reserve or hold an amount of virtual currency or assets from the challenger, which may be forfeited if the challenge is improper.

In general, challenges should be resolved without input from system administrators. Accordingly, in addition to the challenge process described herein, server 150 may permit the affected parties to discuss and resolve the dispute by mutual agreement. If this process fails, a party may escalate the challenge. To discourage improper escalations, additional virtual currency or assets can be taken from all participants pending the outcome.

If the challenge process is escalated, then a system administrator may become involved to decide the challenge. To reduce the number of administrator decisions required, the system may first delegate the challenge to a highly trusted user (e.g., in the same vicinity as the parties involved in the challenge), or to a panel of highly trusted users.

Once a decision is reached for the challenge, the winner(s) of the challenge can be rewarded in currency or assets. If appropriate, the highly trusted users involved in the successful resolution may also be rewarded with currency, assets, or other score value.

Although the description provided herein makes reference to "criterion" in the singular, it will be appreciated that plural criteria may also be used to determine quorum, tally or targeting without departing from the scope of these embodiments.

It will be appreciated that various embodiments may comprise one or more special purpose or general purpose computers or servers, each of which may include, but are not limited to, one or more processors, memories, storage devices, input/output devices and network interfaces. Likewise, the terms 'computer' and 'server' may be interchangeable in accordance with the above description. Furthermore, embodiments may be implemented as computer software instructions stored on a computer readable medium and executed in memory by processors on one or more of the computers or servers contemplated above. Although embodiments have been described as separate components, it will be understood that various components could be combined into a single computer or server, or implemented across multiple computers or servers all connected via a communications medium such as the Internet.

Numerous specific details are set forth herein in order to provide a thorough understanding of the exemplary embodiments described herein. However, it will be understood by those of ordinary skill in the art that these embodiments may be practiced without these specific details. In other instances, well-known methods, procedures and components have not been described in detail so as not to obscure the description of the embodiments. Furthermore, this description is not to be considered as limiting the scope of these embodiments in any way, but rather as merely describing the implementation of these various embodiments.

The invention claimed is:

1. A method comprising:
receiving, by a server computer from a first computing device, a challenge alleging that a data item is inaccurate, the challenge being associated with a first bid having a first amount, the first bid drawing at least a portion of a first score value indicating a trustworthiness of a first user submitting the challenge using the first computing device;
receiving, by the server computer from a second computing device, a second bid having a second amount and being associated with an allegation that the data item is accurate, the second bid drawing at least a portion of a second score value indicating a trustworthiness of a second user submitting the second bid using the second computing device;
verifying the data item based on the challenge using a processor executing a challenge verification process, the verifying including obtaining a challenge result indicating whether the data item is accurate; and
redistributing the first amount in the first bid and the second amount in the second bid to at least one of the first score value or the second score value based on the challenge result, including:
in response to determining that the data item is inaccurate, returning the first amount of the first bid to the first score value and adding at least a portion of the second amount of the second bid to the first score value; or
in response to determining that the data item is accurate, returning the second amount of the second bid to the second score value and adding at least a portion of the first amount of the first bid to the second score value.

2. The method of claim 1, wherein the challenge verification process verifies the data item by polling one or more computer devices, the challenge verification process comprising identifying the one or more computing devices based on one or more target criteria.

3. The method of claim 2, wherein the one or more target criteria include a respective device location of the one or more computing devices, and wherein the identifying comprises locating the one or more computing devices within a predetermined range of a location associated with the data item.

4. The method of claim 2, wherein the one or more target criteria relate to the data item or a poll object.

5. The method of claim 2, wherein the challenge verification process comprises:
generating a poll object for the data item;
determining a quorum criterion and a tally criterion for the poll object;
transmitting a poll notification associated with the poll object to the one or more computing device; and
verifying the challenge based on responses received from the one or more computing devices.

6. The method of claim 5, the challenge verification process further comprising, upon determining that the quorum criterion is not satisfied, increasing a priority associated with the poll object.

7. The method of claim 5, wherein the tally criterion is a majority of the one or more responding devices.

8. The method of claim 5, wherein the quorum criterion is a predetermined number of devices.

9. The method of claim 5, the challenge verification process further comprising:
upon determining that the quorum criterion is not satisfied, changing the quorum criterion; and
transmitting a further poll notification associated with the poll object to one or more additional computing devices, wherein the one or more responding devices also comprise at least one of the one or more additional computing devices.

10. The method of claim 5, the challenge comprising an update to the data item, the method comprising updating the data item according to the challenge in response to determining that the data item is inaccurate.

11. The method of claim 5, wherein the one or more target criteria include at least one of: a time elapsed since the data item was last verified, a time elapsed since the poll notification was transmitted, a priority associated with the data item, an activity history proximate to the data item, or a priority associated with the poll object.

12. The method of claim 1, wherein the first and second computing devices comprise at least one mobile device.

13. The method of claim 1, wherein a respective user profile is associated with each of the first and second computing devices, the first score value being a portion of a first user profile and the second score value being a portion of a second user profile.

14. The method of claim 13, wherein each user profile is associated with a respective computing device through registration.

15. The method of claim 13, wherein the one or more target criteria relate to a respective user profile associated with each of the one or more computing devices.

16. The method of claim 15, wherein the one or more target criteria include an anticipated score value adjustment.

17. The method of claim 15, wherein the one or more target criteria include at least one of: a user availability in the user profile, a user preference in the user profile, or a user history in the user profile.

18. The method of claim 1, wherein the challenge result is determined based on a tally criterion by weighting a set of response notifications according to a respective score value associated with each of one or more responding devices.

19. The method of claim 1, wherein the second bid is a matching bid received after the first bid is received, the second amount of the second bid being at least the same as the first amount of the first bid.

20. The method of claim 1,
wherein updating the score value for the challenging device and the second computing device based on the challenge result comprises:
upon determining that the data item is inaccurate, decreasing the second score value by the second amount of the second bid; or
upon determining that the challenge result indicates that the data item is accurate, decreasing the first score value by the amount of the first bid.

21. A system, comprising:
a database for storing a data item;
one or more processors configured to perform operations comprising:
receiving, by the one or more processors from a first computing device, a challenge the data item is inaccurate, the challenge being associated with a first bid having a first amount, the first bid drawing at least a portion of a first score value indicating a trustworthiness of a first user submitting the challenge using the first computing device;
receiving, by the one or more processors from a second computing device, a second bid having a second amount and being associated with an allegation that the data item is accurate, the second bid drawing a portion of a second score value indicating a trustworthiness of a second user submitting the second bid using the second computing device;
verifying the data item based on the challenge using a challenge verification process, the verifying including obtaining a challenge result indicating whether the data item is accurate; and
redistributing the first amount in the first bid and the second amount in the second bid to at least one of the first score value or the second score value based on the challenge result, including:
in response to determining that the data item is inaccurate, returning the first amount of the first bid to the first score value and adding at least a portion of the second amount of the second bid to the first score value; or
in response to determining that the data item is accurate, returning the second amount of the second bid to the second score value and adding at least a portion of the first amount of the first bid to the second score value.

22. The system of claim 21, wherein the challenge verification process verifies the data item by polling one or more computer devices, the verification process comprising identifying the one or more computing devices based on one or more target criteria.

23. The system of claim 22, wherein the one or more target criteria include a respective device location of the one or more computing devices, and wherein the identifying comprises locating the one or more devices within a predetermined range of a location associated with the data item.

24. The system of claim 22, wherein the one or more target criteria relates to the data item or a poll object.

25. The system of claim 22, wherein the challenge verification processes comprises:
generating a poll object for the data item;
determining a quorum criterion and a tally criterion for the poll object;
transmitting a poll notification associated with the poll object to the one or more computing device; and
verifying the challenge based on responses received from the one or more computing devices.

26. The system of claim 25, wherein the challenge verification process further comprising, upon determining that the quorum criterion is not satisfied, increase a priority associated with the poll object.

27. The system of claim 25, wherein the tally criterion is a majority of the one or more responding devices.

28. The system of claim 25, wherein the quorum criterion is a predetermined number of devices.

29. The system of claim 25, wherein the challenge verification process comprises:
upon determining that the quorum criterion is not satisfied, changing the quorum criterion; and
transmitting a further poll notification associated with the poll object to one or more additional computing devices, wherein the one or more responding devices also comprise at least one of the one or more additional computing devices.

30. The system of claim 25, wherein the challenge comprises an update to the data item, the method comprising updating the data item according to the challenge in response to determining that the data item is inaccurate.

31. The system of claim 25, wherein the one or more target criteria includes at least one of: a time elapsed since the data item was last verified, a time elapsed since the poll notification was transmitted, a priority associated with the data item, an activity history proximate to the data item, or a priority associated with the poll object.

32. The system of claim 21, wherein the first and second computing devices comprise at least one mobile device.

33. The system of claim 21, wherein a respective user profile is associated with each of the first and second computing devices, the first score value being a portion of a first user profile and the second score value being a portion of a second user profile.

34. The system of claim 33, wherein each user profile is associated with a respective computing device through registration.

35. The system of claim 33, wherein the one or more target criteria relates to the respective user profile associated with each of the one or more computing devices.

36. The system of claim 35, wherein the one or more target criteria includes an anticipated score value adjustment.

37. The system of claim 35, wherein the one or more target criteria include at least one of: a user availability in the user profile, a user preference in the user profile, or a user history in the user profile.

38. The system of claim 21, wherein the second bid is a matching bid received after the first bid is received, the second amount of the second bid being at least the same as the first amount of the first bid.

39. The system of claim 21, wherein the challenge result is determined based on a tally criterion by weighting a set of response notifications according to a respective score value associated with each of one or more responding devices.

40. The system of claim 21, wherein updating the score value for the challenging device and the second computing device based on the challenge result comprises:
upon determining that the data item is inaccurate, decreasing the second score value by the second amount of the second bid; or
upon determining that the challenge result indicates that the data item is accurate, decreasing the first score value by the amount of the first bid.

41. At least one non-transitory computer readable storage medium with an executable program stored thereon, wherein the executable program is configured to instruct a processor to perform the method of any one of claims 1 to 20.

* * * * *

UNITED STATES PATENT AND TRADEMARK OFFICE
CERTIFICATE OF CORRECTION

PATENT NO. : 9,767,137 B2
APPLICATION NO. : 13/643895
DATED : September 19, 2017
INVENTOR(S) : Ritchie et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 852 days.

Signed and Sealed this
Twenty-fifth Day of September, 2018

Andrei Iancu
*Director of the United States Patent and Trademark Office*